(12) United States Patent
Marshall et al.

(10) Patent No.: US 7,556,136 B2
(45) Date of Patent: Jul. 7, 2009

(54) CONVEYOR BELT MODULE WITH RETAINED ROLLERS

(75) Inventors: Angela L. Marshall, Harahan, LA (US); Brien G. Rau, Jefferson, LA (US); David W. Bogle, Round Rock, TX (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 11/870,458

(22) Filed: Oct. 11, 2007

(65) Prior Publication Data

US 2009/0095599 A1  Apr. 16, 2009

(51) Int. Cl.
*B65G 47/10* (2006.01)
(52) U.S. Cl. .................................. 198/370.09; 198/853
(58) Field of Classification Search ............ 198/370.09, 198/779, 850, 853
See application file for complete search history.

(56) References Cited

U.S. PATENT DOCUMENTS

| | | | |
|---|---|---|---|
| 3,964,588 A | 6/1976 | Kornylak | |
| 4,231,469 A | 11/1980 | Arscott | |
| 6,318,544 B1 | 11/2001 | O'Connor et al. | |
| 6,494,312 B2 | 12/2002 | Costanzo | |
| 6,568,522 B1 | 5/2003 | Boelaars | |
| 6,681,922 B2 | 1/2004 | Corley et al. | |
| 6,827,198 B1 | 12/2004 | Costanzo | |
| 6,874,617 B1 | 4/2005 | Layne | |
| 6,997,306 B2 | 2/2006 | Sofranec et al. | |
| 6,997,309 B2 | 2/2006 | Stebnicki et al. | |
| 7,021,454 B2 | 4/2006 | Ozaki et al. | |
| 7,137,505 B2 | 11/2006 | Stebnicki et al. | |
| 7,246,700 B2 | 7/2007 | Stebnicki et al. | |
| 7,252,191 B2 | 8/2007 | Ozaki et al. | |
| 2004/0173441 A1 | 9/2004 | Wieting et al. | |
| 2007/0089970 A1 | 4/2007 | Damkjaer | |
| 2007/0181402 A1 | 8/2007 | Fourney | |
| 2007/0221472 A1 | 9/2007 | Fourney | |
| 2008/0105518 A1* | 5/2008 | Krisl et al. .................. | 198/853 |

OTHER PUBLICATIONS

International Search Report, PCT/US08/79507, "Conveyor Belt Module with Retained Rollers," ISA/EP, European Patent Office, Rijswijk, Netherlands, Mar. 10, 2009.

\* cited by examiner

*Primary Examiner*—James R Bidwell
(74) *Attorney, Agent, or Firm*—James T. Cronvich

(57) ABSTRACT

A belt module with embedded rollers retained in cavities in the module by retention structure insertable into the module. The rollers and cavities are elongated in the direction of belt travel and closely separated by narrow dividers that form outward-facing surfaces that can serve as bearing surfaces for a belt made of the modules when the rollers are inactivated. When activated, the rollers, which rotate on axles parallel to the direction of belt travel, are supported directly on conveyor rolling surfaces. The dividers also carry the belt tension and stiffen the module.

20 Claims, 9 Drawing Sheets

CONVEYOR BELT MODULE WITH RETAINED ROLLERS

BACKGROUND

The invention relates to power-driven conveyors generally and, more specifically, to modular plastic conveyor belts with rollers retained in belt modules.

Embedding article-supporting rollers in modular plastic conveyor belts and retaining them in place with a retainer are well known. For example, U.S. Pat. No. 6,997,306 describes short, widely spaced cylindrical rollers retained by retainer rings welded into place in roller cavities in a modular belt. The widely spaced rollers provide a limited amount of rolling surface to conveyed objects. Furthermore, if a weld should fail, the retainer ring, along with the unretained roller and axle, can jostle loose and contaminate conveyed products.

SUMMARY

These shortcomings can be avoided in a conveyor belt constructed of modules embodying features of the invention. In one aspect of the invention, a belt module comprises a module base with a roller retained in a cavity formed in the base. Seats are formed in the base at opposite ends of the cavity. Opposite ends of axles for the rollers are supported in the seats. A roller cover covering the ends of the axle is bonded to the module base at discrete positions closely flanking the seats. The roller cover retains the axle and its roller in the belt module.

In another aspect of the invention, a belt module comprises a first end portion and an opposite second end portion defining the length of the module. A first plurality of hinge elements is disposed along the first end portion, and a second plurality of hinge elements disposed along the second end portion. The hinge elements of each plurality are spaced apart laterally across the width of the module. Cavities elongated in the length direction extending through the module at laterally spaced locations across the width of the module. Rollers are disposed in the cavities for rotation on axles that extending along the length of the module. Dividers disposed between adjacent cavities and form outward-facing surfaces between adjacent cavities. The outward-facing surfaces have a width less than the diameter of the rollers.

In yet another aspect of the invention, a belt module comprises a plurality of individual elongated cavities closely spaced across the width of the belt module. The cavities extend through the thickness of the module. Rollers, supported on axles spanning the cavities, rotate in the width direction of the belt module. The diameters of the rollers are greater than the thickness of the belt module. Narrow dividers disposed between adjacent cavities form outward-facing surfaces of the belt module between adjacent cavities. Retention structure forms all or part of one or more hinge elements on opposite ends of the belt module. The retention structure, which retains the rollers in the cavities, is formed separately from and is insertable into the rest of the belt module.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 2:
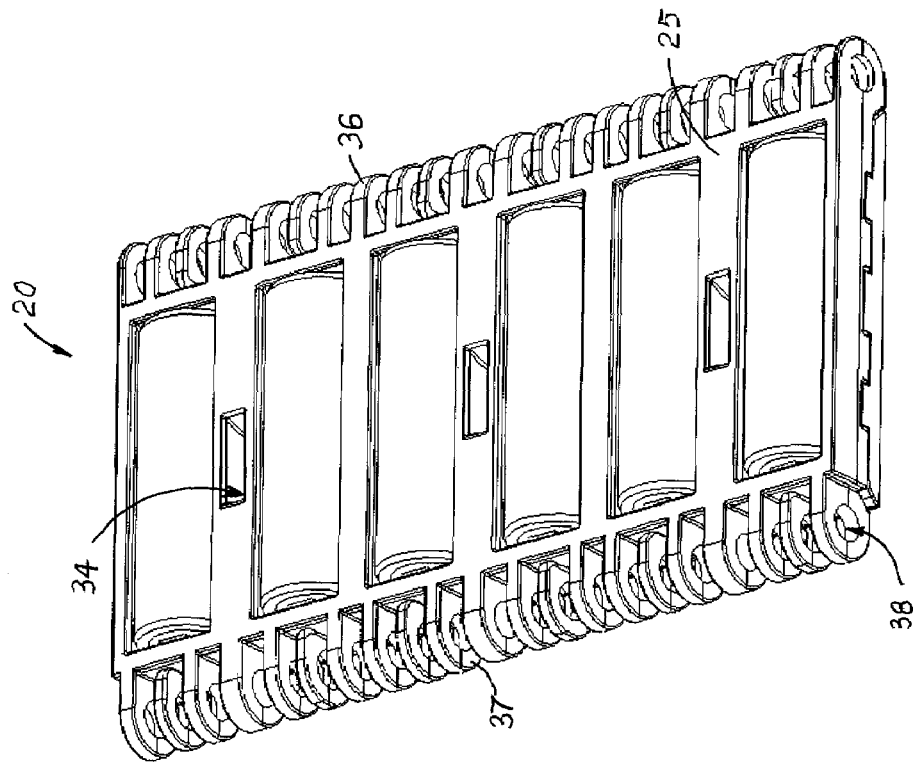
FIG. 2 is an oblique view of the bottom side of the module of FIG. 1.

One version of a conveyor belt module and its constituent parts, all embodying features of the invention, are shown generally in FIGS. 1-8. The exemplary module 20 shown in the figures has six rollers 22 spaced apart transversely, or laterally, across the module's width. Salient portions of the rollers protrude above the outer surface 24 of the module to support conveyed articles on a common plane. The rollers are referred to as "transverse" rollers because they rotate on axes 26 parallel to the direction of belt travel 28 to push supported articles toward one side of the belt or the other—transverse to the direction of belt travel—as indicated by arrow 30. The rollers are also referred to as 90° rollers because they push articles in a direction 90° from the direction of belt travel.

The rollers are retained in place in the modules by retention structure in the form of covers 32. Each cover retains a pair of rollers and forms a portion of the outer surface 24 of the belt module. As shown in FIG. 2, the diameter of the rollers preferably exceeds the thickness of the module as measured from the outer surface 24 to an opposite inner belt surface 25. In this way, the roller protrudes past the inner belt surface at the bottom of the module. Drive pockets 34 formed in the outward-facing inner surface receive the teeth of drive and idle sprockets (not shown) to drive and track a belt made of a series of the modules. Two groups of hinge elements 36, 37 at opposite ends of the module define the module's length. The laterally spaced hinge elements at each end interleave with those of adjacent modules. Apertures 38 in the interleaved hinge elements form a transverse passageway that can receive a hinge rod to connect adjacent modules together.

Figure 3:
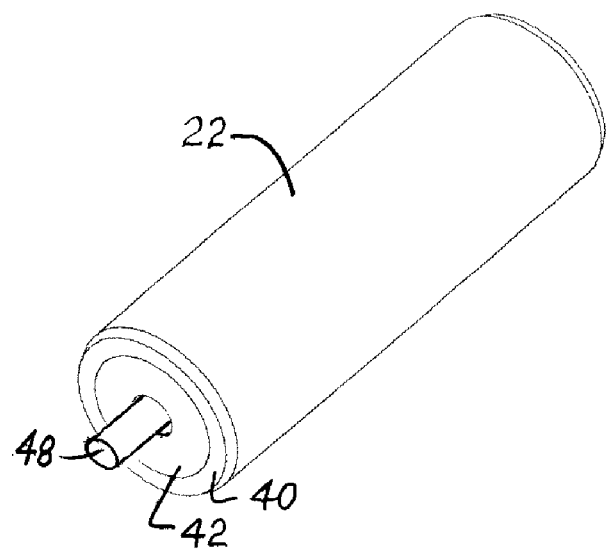
FIG. 3 is an isometric view of a two-material roller in the belt module of FIG. 1.
Figure 4:
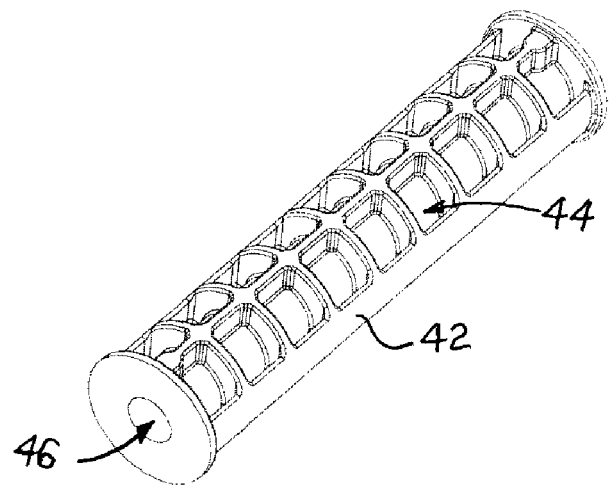
FIG. 4 is an isometric view of the substrate of the roller in FIG. 3.

The modules and the covers are preferably molded separately in an injection-molding process and are made of a thermoplastic polymer, such as polypropylene, polyethylene, acetal, or composite materials. The rollers 22, as shown in FIGS. 3 and 4, include an outer tread, or skin 40, made of a high-friction elastomer molded onto a substrate in the form of an elongated hub 42 made of a thermoplastic polymer. Waffle-like indentations 44 dimpling the outer surface of the hub provide more surface area for better adhesion of the skin. A bore 46 through the hub receives an axle 48 on which it can rotate. The axle is preferably made of a rigid material such as stainless steel to resist bowing that could cause the roller to bind.

Figure 5:
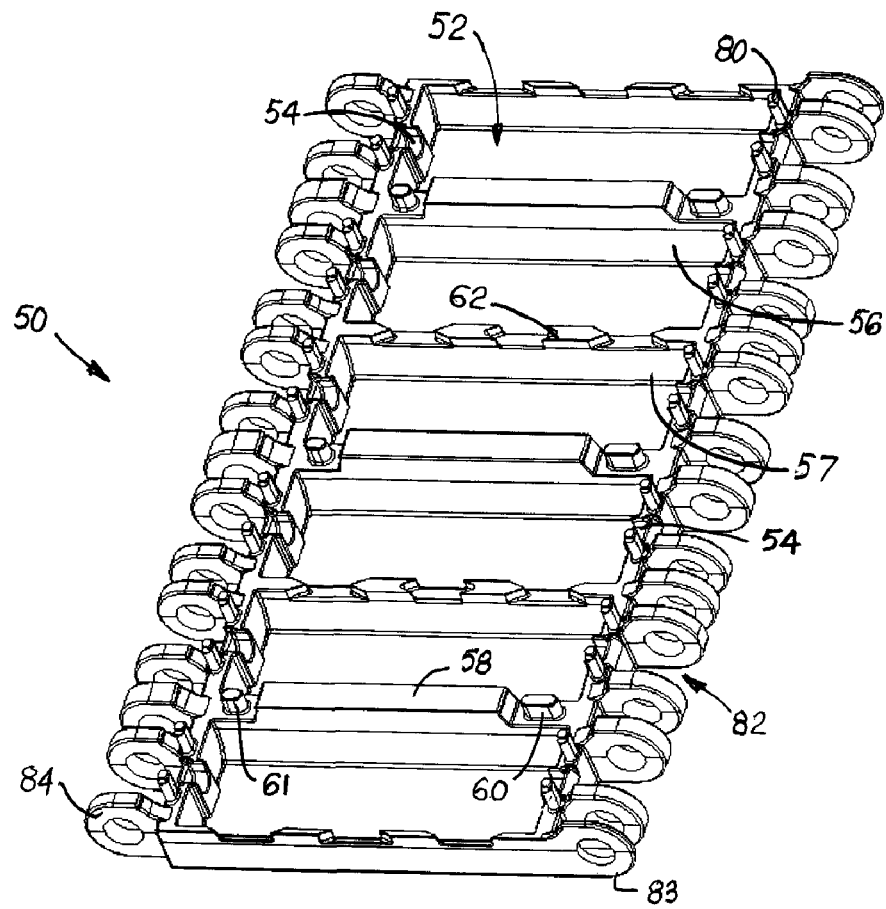
FIG. 5 is an oblique view of the top side of a belt module as in FIG. 1 before installation of the rollers and roller covers.
Figure 6:
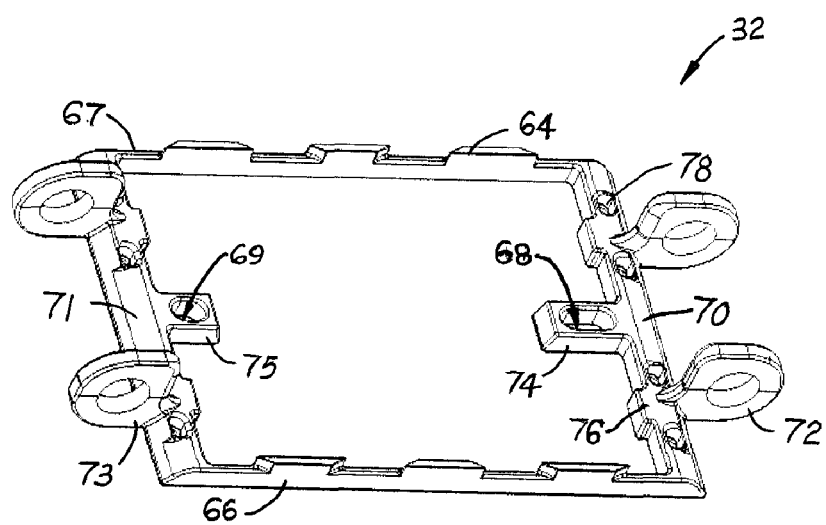
FIG. 6 is an oblique view of the bottom side of a roller cover as in the belt module of FIG. 1.

The module is shown in FIG. 5 without the rollers or their covers. The module in this example has a base portion 50 with six cavities 52—one for each roller. U-shaped axle seats 54 at the fore and aft ends of the cavities support the opposite ends of the roller axles. The first and second dividers 56, 57 separate the adjacent roller cavities, carry some of the belt tension, and stiffen the module. The first dividers 56 have a flat top portion 58 that forms the outer belt surface of the module. The first divider separates two rollers retained by the same cover. The width of the dividers is preferably less than the diameter of the rollers for a high-density roller arrangement. Long and short studs 60, 61 at opposite ends of the first divider help with the installation of the cover. The tops 62 of the second dividers 57 are castellated to mate with the castellated bottom rim 64 of the cover 32, as shown in FIG. 6. Each second divider supports the abutting side 66 of two adjacent covers. Long and short keyholes 68, 69 in the covers receive the corresponding keying studs 60, 61 in the module base. This maintains the loose cover in place before it is permanently bonded to the base.

Each cover 32 is generally rectangular in shape. One pair of opposite sides 66, 67 has a castellated bottom rim 64 that rests on the second dividers in the module base. Another pair of sides 70, 71, perpendicular to the first pair, form fore and aft ends of the cover. Hinge elements 72 extending outward from the fore side 70 are transversely offset from hinge elements 73 extending outward from the aft side 71. The offset makes the cover asymmetrical, but the different-sized keyholes 68, 69 formed in inward projections 74, 75 midway along the fore and aft sides help ensure that the covers are installed correctly. (The module could alternatively be designed symmetrically, in which event the cover need not be keyed with different-sized keyholes and could be reversible.) In a correct installation, the hinge elements 72, 73 of the cover fill gaps 82 in the hinge-element pattern 83, 84 of the base to result in the generally regularly spaced hinge elements 36, 37 of the complete module. Also projecting inward from the fore and aft sides are axle retainers, such as bosses 76, that sit atop the ends of the axles received in the axle seats 54 in the module base. The axle retainers hold the ends of the roller axles firmly in place. Sockets 78 flanking each of the axle retainers receive weld posts 80 at discrete positions flanking each of the axle seats 54 in the module body.

Figure 8:
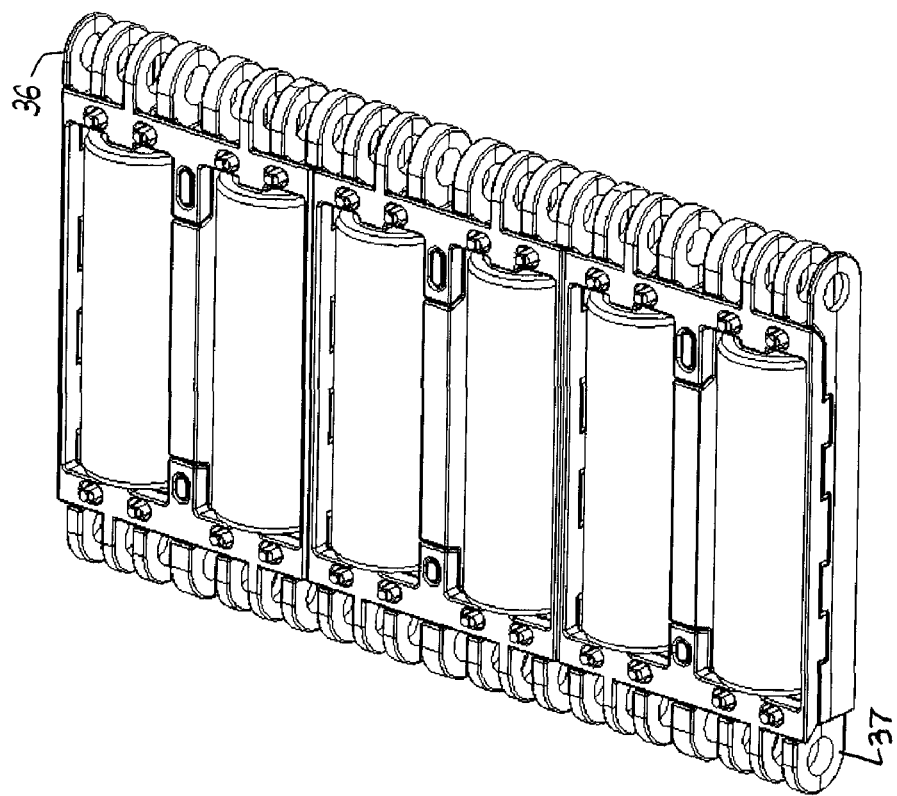
FIG. 8 is an oblique view of the top side of the belt module of FIG. 5 with six rollers and three roller covers installed.
Figure 7:
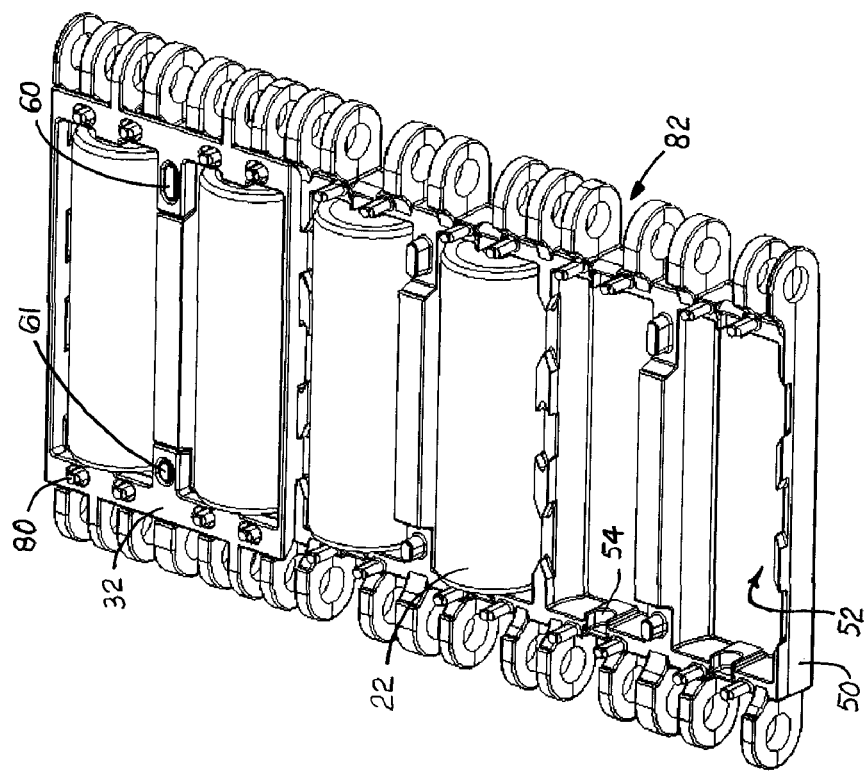
FIG. 7 is an oblique view of the top side of a belt module as in FIG. 5 with four rollers and one roller cover installed.
Figure 9:
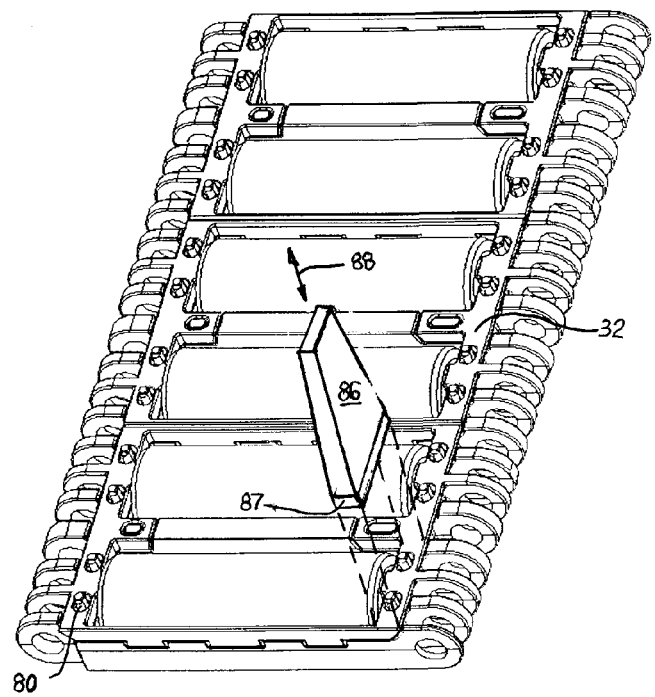
FIG. 9 is an oblique view of the module of FIG. 8 showing the ultrasonic welding horn positioned above the module before welding.

The assembly of a module is shown generally in FIGS. 7-9. Rollers 22, with their axles, are placed in the cavities 52 in the module base 50. The ends of the roller axles rest in the axle seat 54. A cover 32 is positioned over each pair of rollers with the weld posts 80 protruding through the cover sockets 78. The keying studs 60, 61 reside in the corresponding keyholes. The hinge elements 72, 73 of the cover reside in the gaps 82 in the base's hinge-element pattern to make an overall regularly spaced arrangement of hinge elements 36, 37 along each end.

Figure 1:
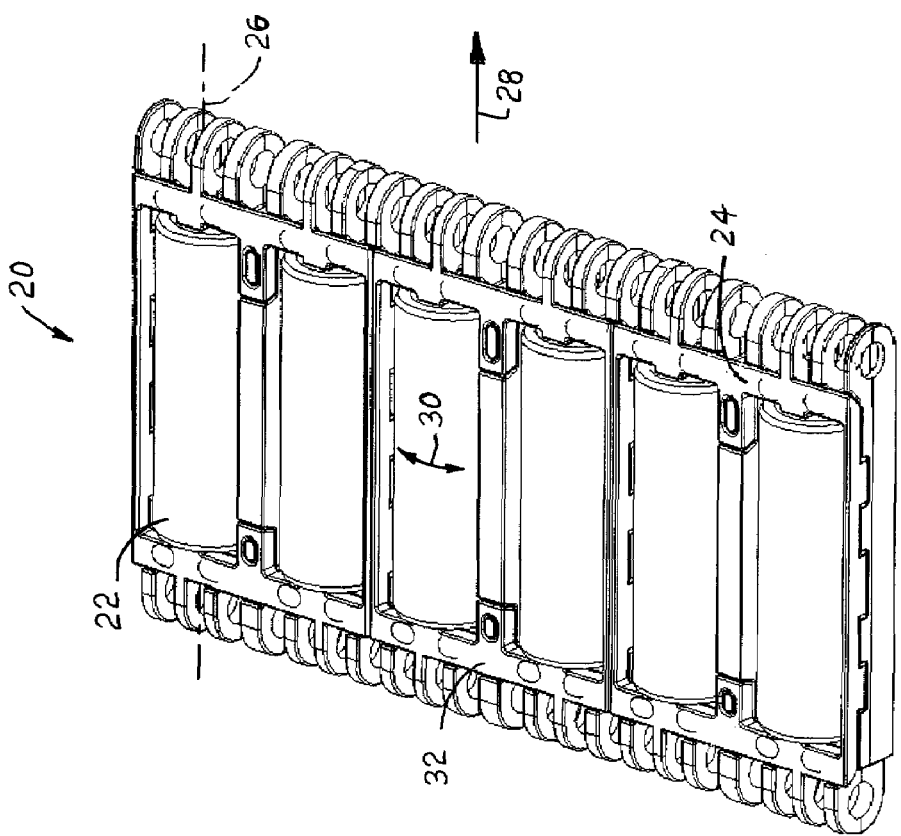
FIG. 1 is an oblique view of the top side of a transverse-roller conveyor belt module embodying features of the invention.

As shown in FIG. 9, the covers 32 are preferably welded in place ultrasonically. A relatively small ultrasonic horn 86 is lowered into place as indicated by arrow 88 atop a pair of the weld posts 80 protruding through the cover sockets. The horn has a textured surface 87. The high-frequency vibration of the horn pressed against the post and the surrounding walls of the sockets causes them to melt and bond together. The textured surface helps prevent sliding between the post and the horn, which makes for a neater weld. The posts are flattened to the level of the outer surface of the cover, as shown in FIG. 1. Because the welded posts closely flank the ends of the roller axles, they retain the axles firmly in place. An array of four small horns could be raised and lowered together to weld the cover at all four weld spots simultaneously.

Figure 10:
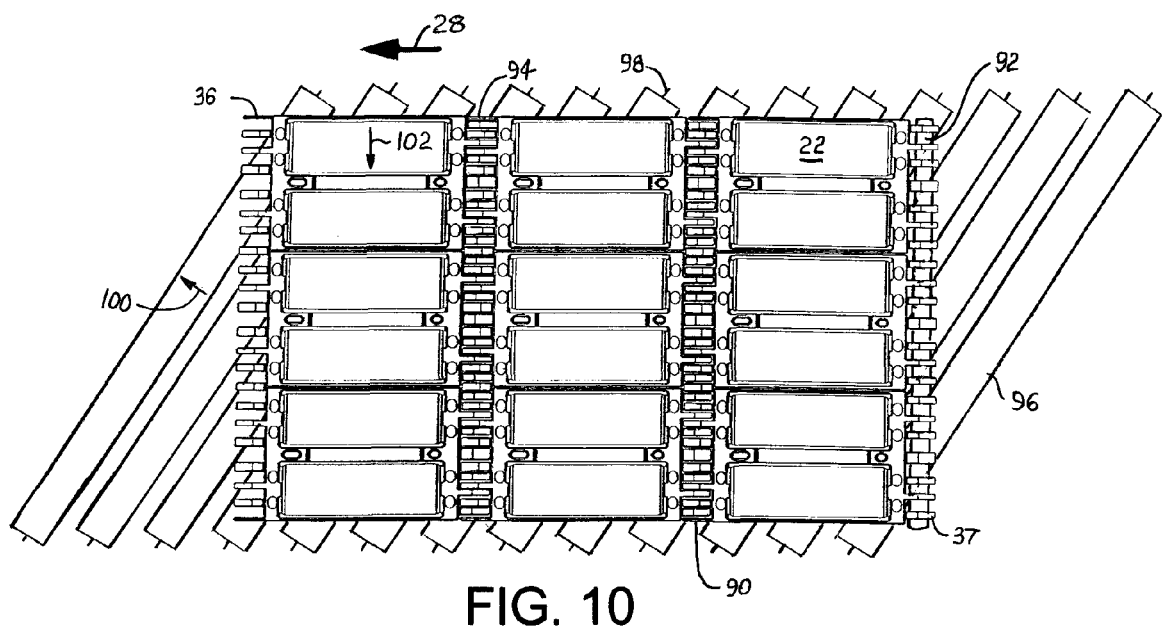
FIG. 10 is a top plan view of a portion of a conveyor using a conveyor belt constructed of the belt modules of FIG. 1.

A portion of one example of a conveyor that can be made using a conveyor belt constructed of the modules 20 of FIG. 1 is shown in FIG. 10. The modules 20 are connected together at hinge joints 90 between consecutive modules. The hinge joints are formed by the interleaved hinge elements 36, 37 of adjacent modules. Hinge pins 92 received in the transverse passageways formed by the aligned apertures in the hinge elements at the joints connect the modules together into an endless conveyor belt 94 that can articulate at its hinge joints. Because some of the hinge elements are provided by the roller covers, the hinge pins also serve to retain the covers in place in the event of a bonding failure. The conveyor belt 94 is driven in the direction of belt travel 28 atop a carryway formed by an array of carryway rollers 96 supported in a conveyor frame. Carryway rollers can rotate on axes 98 oblique to the direction of belt travel. As the belt advances atop the carryway rollers, they rotate in the direction given by arrow 100, which causes the transverse belt rollers 22 contacting them to rotate in the direction given by arrow 102. In this way, articles conveyed atop the belt rollers can be directed toward or off the side of the belt as it advances in the direction of belt travel.

Figure 11:
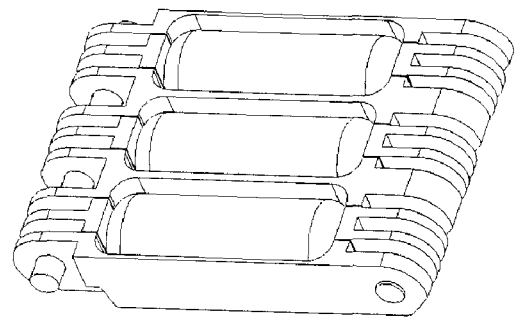
FIG. 11 is an oblique side view of another version of a belt module having a roller axle retained in insertable hinge elements and usable in a conveyor as in FIG. 10.
Figure 12:
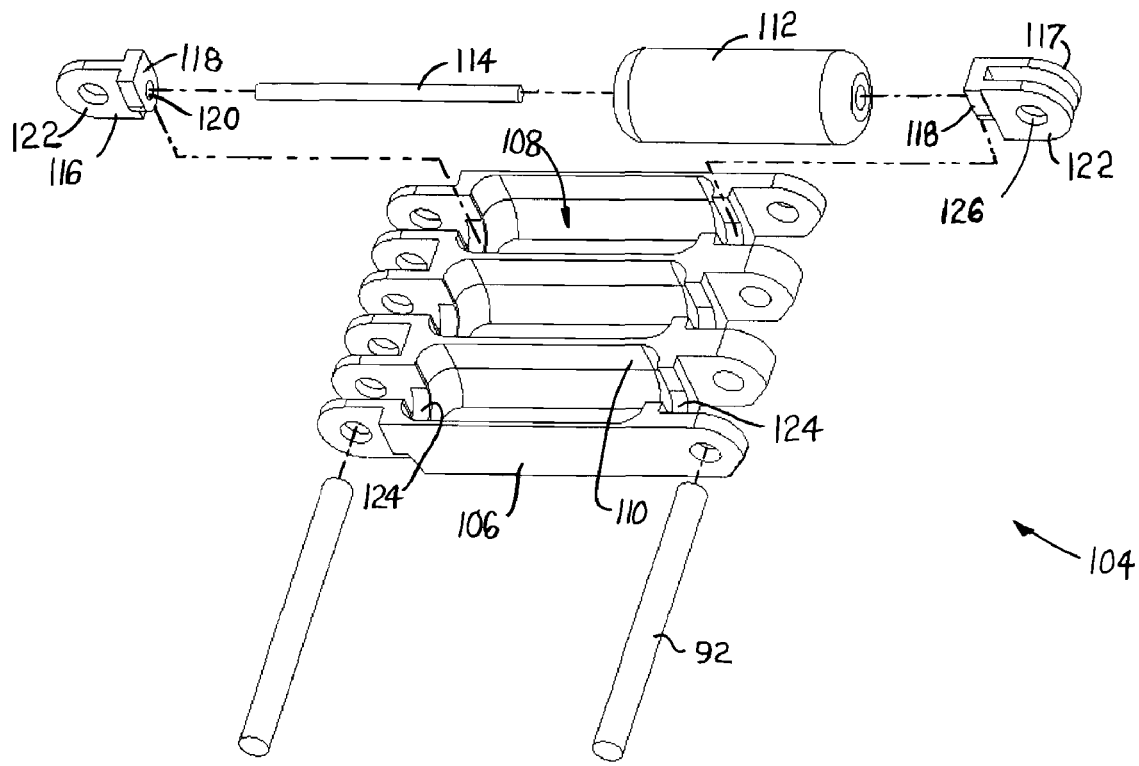
FIG. 12 is an exploded view of the belt module of FIG. 11.

Another belt module that can be used to build a belt as in FIG. 10 is shown in FIGS. 11 and 12. The module 104 has a base portion 106 with cavities 108 separated by dividers 110. A roller assembly includes a roller 112, an axle 114 through the roller's bore, and axle-retention elements 116, 117. Each retention element has a tab 118 with an opening 120 for receiving an end of the axle. In this example, the first retention element 116 has a hinge element 122 extending perpendicularly from the tab. The second retention element 117 has two hinge elements extending perpendicularly from the tab. The roller assembly is inserted into the module with the tabs 118 received in mating U-shaped receptacles 124 at the ends of each elongated cavity. Hinge rods 92 linking consecutive modules extend through the openings 126 in the hinge elements to retain the rollers in place. The retention elements 116, 117 could also be welded or bonded in place for extra security.

Figure 13A:
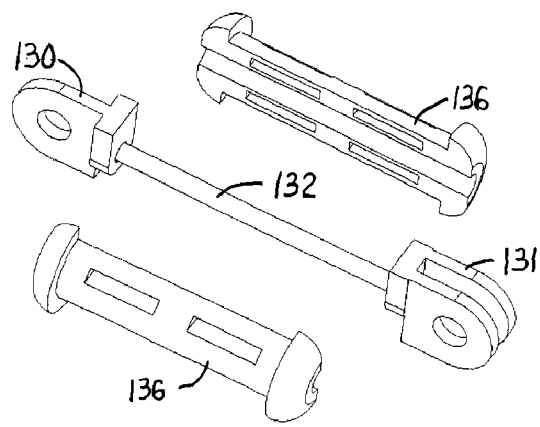
FIGS. 13A and 13B are exploded and isometric views of another version of a roller assembly usable in a belt module as in FIG. 11 with the roller formed on a split substrate.
Figure 13B:
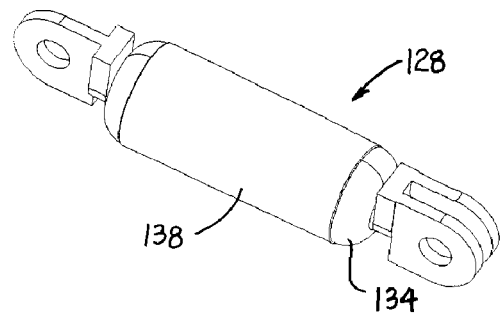

Another version of a roller assembly insertable into a belt module as in FIG. 12 is shown in FIGS. 13A and 13B. The roller assembly 128 differs from the one in FIG. 12 in that the retention elements 130, 131 and the axle 132 are unitarily formed as one piece. A roller 134, which mounts on the axle, includes two substrate halves 136 held together and encircled by a high-friction tread 138. The assembly is formed by positioning the substrate halves together around the axle and putting that subassembly into a molding machine that molds the tread to the abutting substrate halves.

Figure 14:
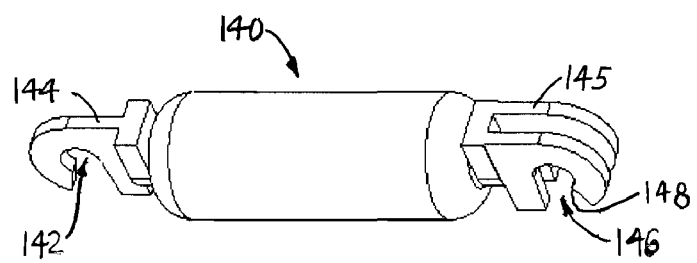
FIG. 14 is an oblique view of another version of a roller assembly that can snap into place in a belt module as in FIG. 11.

A readily insertable roller assembly is shown in FIG. 14. The roller assembly 140, which may be constructed from a split substrate as in FIG. 13A or out of individual piece parts as in FIG. 12, has open hinge-rod holes 142, instead of closed holes, in axle-retention elements 144, 145. The mouths 146 of the flared openings into the rod holes interrupt the rod-hole wall from the bottom so that the assembly can be inserted into the module as in FIG. 12, even when the hinge rods are already installed. Because the rod-hole walls extend more than 180° around the rod holes, they form interfering tangs 148 that allow the assembly to snap removably in place on the hinge rod for easy assembly and replacement.

Figure 15:
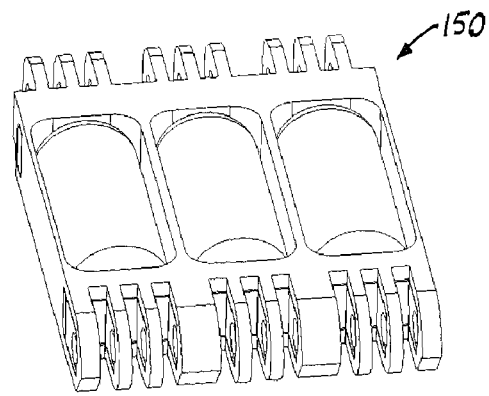
FIG. 15 is an oblique end view of yet another version of a belt module having stocks for supporting the roller axles at both ends and usable in a conveyor as in FIG. 10.
Figure 16:
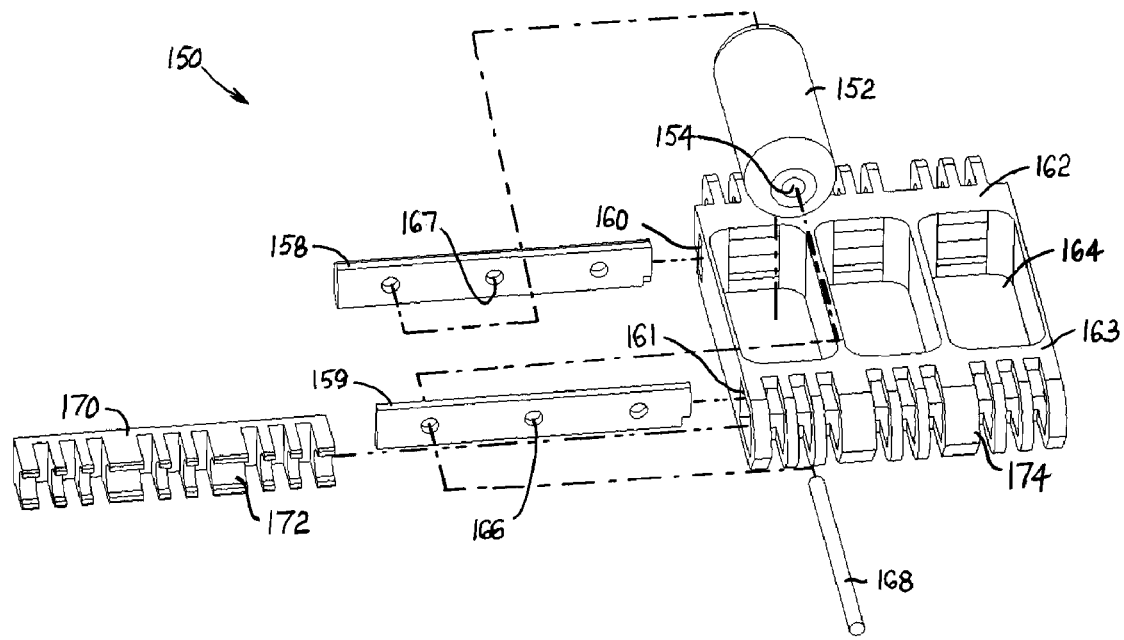
FIG. 16 is an exploded view of the belt module of FIG. 15.

Another version of a roller-belt module is shown in FIGS. 15 and 16. In this module 150, an axially elongated roller 152 having an axial bore 154 is inserted in a roller cavity 164. Axle retention elements in the form of stocks 158, 159 are inserted into slots 160, 161 formed in end portions 162, 163 of the module. The slots open onto the roller cavities so that the two stocks face each other across the lengths of the cavities. Holes 166, 167 in the stocks are aligned across the cavities and with the bores of the rollers. An axle 168 is inserted through the hole 166 in the front stock 159 in the roller bore 154 and into the hole 167 in the rear stock 158, which may be a blind hole. Retention structure in the form of a block 170 is then inserted into the enlarged slot 161 between the front stock and the distal end of the hinge elements to retain, in this example, three rollers in place. The block 170 includes structure 172 forming part of and completing the hinge-element structure 174.

Figure 17:
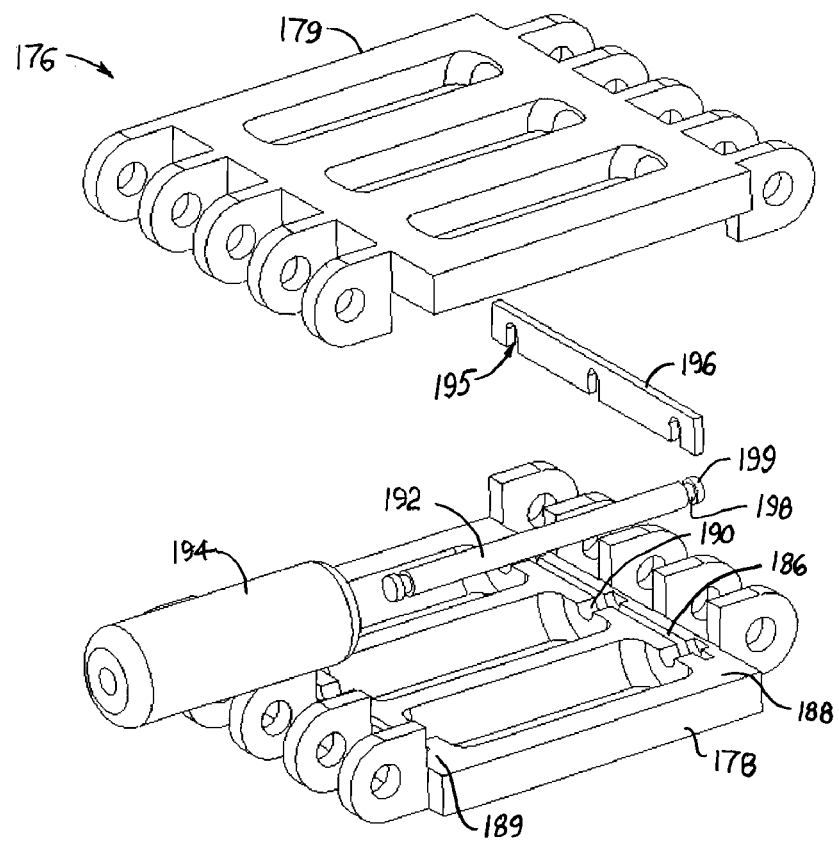
FIG. 17 is an exploded view of still another version of a split belt module having axle-retaining stocks and usable in a conveyor as in FIG. 10.
Figure 18:
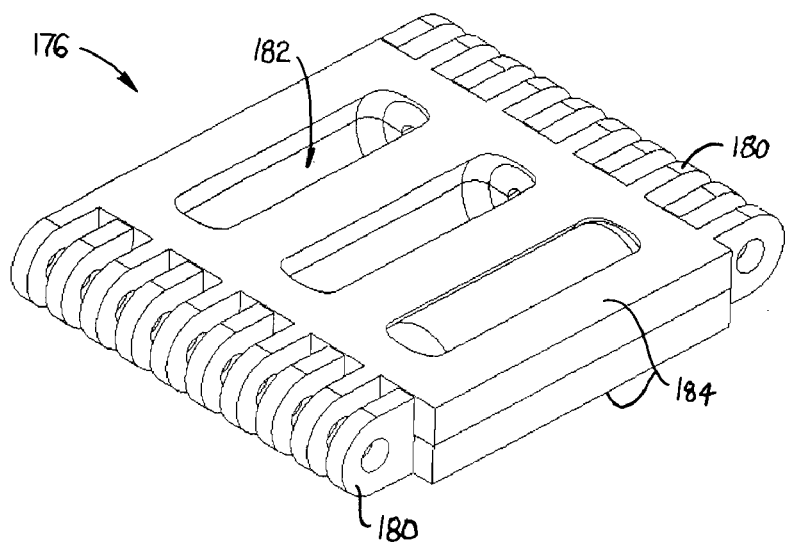
FIG. 18 is an isometric view of the assembled belt module of FIG. 17.

Still another version of roller-belt module is shown in FIGS. 17 and 18. A split belt module 176 is formed by a base module portion 178 and a cover module portion 179 meeting generally at a central plane. Both portions could be identical. Together the two stacked portions form a belt module having hinge elements 180 on opposite ends and roller cavities 182 opening onto outward-facing surfaces 184 of the module. Each portion provides some of the hinge elements. The base and the cover portions have grooves 186 formed in end portions 188, 189. The grooves are intersected by half-channels 190 extending from the ends of the cavities into the end portions of the module portions. The ends of an axle 192 extending through the axial bore of a roller 194 rest in the half-channels in the base module portion 178. Notches 195 in stocks 196 fit over narrowed necks 198 in the axles. The stocks—one in each end portion—fit in the grooves 186. Heads 199 on the axles prevent the axles from moving axially. The cover portion 179 is stacked on the base portion 178. The grooves 186 in the cover portion nest the tops of the stocks to retain the rollers in the cavities. Hinge rods through the hinge elements help prevent the split belt module from separating. For strength, the axle and the stocks could be made of metal.

Although the invention has been described in detail with respect to a preferred version, other versions are possible. For example, the rollers could be made of skin materials other than elastomers or could be textured to achieve other characteristics. As another example, the modules could be arranged in a bricklay pattern of one or more belt modules in each belt row, rather than in the one-module-per-row belt shown in the example of FIG. 10. And the modules could be used to construct a belt for use in a conveyor having a standard carryway with the belt rollers free of contact or not even extending below the inner side of the belt. So, as these few examples suggest, the scope and spirit of the claims is not meant to be limited to the details of the preferred version.

What is claimed is:

1. A belt module comprising:
    a first end portion and an opposite second end portion defining the length of the module;
    a first plurality of hinge elements disposed along the first end portion;
    a second plurality of hinge elements disposed along the second end portion;
    wherein the hinge elements of each plurality are spaced apart laterally across the width of the module;
    a plurality of cavities elongated in the length direction and extending through the module at laterally spaced locations across the width of the module;
    rollers disposed in the cavities for rotation on axles extending along the length of the module, the rollers having a diameter;
    dividers disposed between adjacent cavities and forming outward-facing surfaces between adjacent cavities;
    roller retention structure for retaining the axles and forming at least a portion of at least one of the hinge elements;
    wherein the roller retention structure includes a hinge element receiving each end of one of the axles, wherein the hinge elements at each end of the axle are insertable into the module.

2. A belt module as in claim 1 wherein the dividers form outward-facing surfaces on opposite sides of the belt module.

3. A belt module comprising:
    a first end portion and an opposite second end portion defining the length of the module;
    a first plurality of hinge elements disposed along the first end portion;
    a second plurality of hinge elements disposed along the second end portion;
    wherein the hinge elements of each plurality are spaced apart laterally across the width of the module;
    a plurality of cavities elongated in the length direction and extending through the module at laterally spaced locations across the width of the module;
    rollers disposed in the cavities for rotation on axles extending along the length of the module, the rollers having a diameter;
    dividers disposed between adjacent cavities and forming outward-facing surfaces between adjacent cavities;
    roller retention structure for retaining the axles and forming at least a portion of at least one of the hinge elements;
    wherein the roller retention structure includes a stock retained in each of the first and second end portions and having openings for receiving the ends of the axles to retain the axles.

4. A belt module as in claim 3 wherein the dividers form outward-facing surfaces on opposite sides of the belt module.

5. A belt module as in claim 3 wherein the roller retention structure further includes a retainer forming a portion of the hinge elements along the first end and disposed between the stock and the distal end of the hinge elements along the first end.

6. A belt module comprising:
    a first end portion and an opposite second end portion defining the length of the module;
    a first plurality of hinge elements disposed along the first end portion;
    a second plurality of hinge elements disposed along the second end portion;
    wherein the hinge elements of each plurality are spaced apart laterally across the width of the module;

a plurality of cavities elongated in the length direction and extending through the module at laterally spaced locations across the width of the module;
rollers disposed in the cavities for rotation on axles extending along the length of the module, the rollers having a diameter;
dividers disposed between adjacent cavities and forming outward-facing surfaces between adjacent cavities;
roller retention structure for retaining the axles and forming at least a portion of at least one of the hinge elements;
wherein the belt module is split generally across a plane through the plurality of cavities into first and second stacked module portions and wherein the roller retention structure includes the first stacked module portion.

7. A belt module as in claim 6 wherein the dividers form outward-facing surfaces on opposite sides of the belt module.

8. A belt module as in claim 6 wherein the roller retention structure includes a roller cover covering the ends of at least one of the axles and bonded to the module at discrete positions closely flanking the ends of the axle.

9. A belt module comprising:
a plurality of individual elongated cavities closely spaced across the width of the belt module and extending through the thickness of the module;
rollers supported on axles spanning the cavities for rotating the rollers in the width direction of the belt module, the rollers having diameters greater than the thickness of the belt module;
narrow dividers disposed between adjacent cavities and forming outward-facing surfaces of the belt module between adjacent cavities;
retention structure forming at least portions of hinge elements on opposite ends of the belt module for retaining the rollers in the cavities, wherein the retention structure is formed separately from and is insertable into the rest of the belt module.

10. A belt module comprising:
a module base having a cavity and seats at opposite ends of the cavity;
a roller disposed in the cavity and having an axle with opposite ends supported in the seats;
a roller cover covering the ends of the roller axle and bonded to the module base at discrete positions closely flanking the seats to retain the axle in the belt module.

11. A belt module as in claim 10 further comprising:
a second cavity with seats at opposite ends of the second cavity;
a second roller disposed in the second cavity and having an axle with opposite ends supported in the seats;
wherein the roller cover covers the ends of both roller axles and is bonded to the module base at positions closely flanking the seats to retain the axles.

12. A belt module as in claim 10 further comprising mating keying structure on the roller cover and module base for fixing the orientation of the roller cover on the module base.

13. A belt module as in claim 12 wherein the keying structure on the module base includes a first stud and a differently shaped second stub upstanding from the module base and the mating keying structure on the roller cover includes first keyhole and a differently shaped second keyhole sized to receive the first and second studs respectively.

14. A belt module as in claim 10 further comprising posts upstanding from the module base at the discrete positions flanking the seats and wherein the roller cover has sockets positioned to receive the posts when the roller cover is in place on the module base.

15. A belt module as in claim 10 wherein the module base has hinge elements along opposite ends with wider spaces at predetermined locations along each end and wherein the roller cover further includes hinge elements extending outward of the roller cover at opposite ends and positioned to reside in the wider spaces at the predetermined locations.

16. A belt module as in claim 10 wherein the roller cover has retainers at opposite ends positioned opposite the seats across the ends of the axle to retain the axle in the seats.

17. A belt module as in claim 10 wherein the axle is parallel to a direction of travel of a belt constructed of a plurality of the belt modules.

18. A belt module as in claim 10 wherein the roller cover is ultrasonically welded to the module base at the positions closely flanking the seats.

19. A belt module as in claim 10 wherein the roller comprises a hub having dimpled outer surface and an elastomeric skin bonded to the dimpled outer surface of the hub.

20. A belt module as in claim 10 wherein the rollers are split rollers having first and second mating sections.

* * * * *